US008422707B2

(12) United States Patent
Elmedyb et al.

(10) Patent No.: US 8,422,707 B2
(45) Date of Patent: Apr. 16, 2013

(54) SPECTRAL CONTENT MODIFICATION FOR ROBUST FEEDBACK CHANNEL ESTIMATION

(75) Inventors: Thomas Bo Elmedyb, Smørum (DK); Jesper Jensen, Smørum (DK)

(73) Assignee: Oticon A/S, Smorum (DK)

( * ) Notice: Subject to any disclaimer, the term of this patent is extended or adjusted under 35 U.S.C. 154(b) by 866 days.

(21) Appl. No.: 12/506,424

(22) Filed: Jul. 21, 2009

(65) Prior Publication Data

US 2010/0020981 A1 Jan. 28, 2010

(30) Foreign Application Priority Data

Jul. 24, 2008 (EP) .................................... 08104856

(51) Int. Cl.
*H04R 25/00* (2006.01)
*H04B 15/00* (2006.01)

(52) U.S. Cl.
USPC ............................. 381/318; 381/94.4; 381/93

(58) Field of Classification Search .................... 381/93, 381/94.4, 318; 704/200.1
See application file for complete search history.

(56) References Cited

U.S. PATENT DOCUMENTS 7,756,276 B2 * 7/2010 Hersbach et al. ............... 381/60
8,170,248 B2 * 5/2012 Hersbach et al. ............. 381/318
2004/0252853 A1 * 12/2004 Blamey et al. ................ 381/318
2005/0036629 A1 2/2005 Aubauer et al.
2005/0047620 A1 3/2005 Fretz
2006/0253209 A1 11/2006 Hersbach et al.
2007/0269068 A1 11/2007 Komagel et al.

FOREIGN PATENT DOCUMENTS

EP 0 443 547 A2 8/1991
EP 1538868 A2 6/2005
EP 1793645 A2 6/2007
WO WO-2004/105430 A1 12/2004
WO WO-2007/006658 A1 1/2007
WO WO-2007/053896 A1 5/2007

* cited by examiner

*Primary Examiner* — Duc Nguyen
*Assistant Examiner* — Kile Blair
(74) *Attorney, Agent, or Firm* — Birch, Stewart, Kolasch & Birch, LLP

(57) ABSTRACT

A listening device includes an input and output transducers and a forward path defined between the transducers. The forward path may include a signal processing unit processing an SPU-input signal originating from the electric input signal in a time-frequency representation having successive time frames each having a frequency spectrum of the signal in the time frame in question. The signal processing unit includes a spectral content modification unit to modify values of the signal of one or more regions of the frequency spectrum of a given time frame so that the modified values are less correlated to the corresponding time-frequency regions of the input signal. A feedback path estimation unit is uses he improved processed output signal in the feedback estimation. The spectral content modification unit may base the modification on a model of the human auditory system so that the modifications are not perceptible by the user.

21 Claims, 1 Drawing Sheet

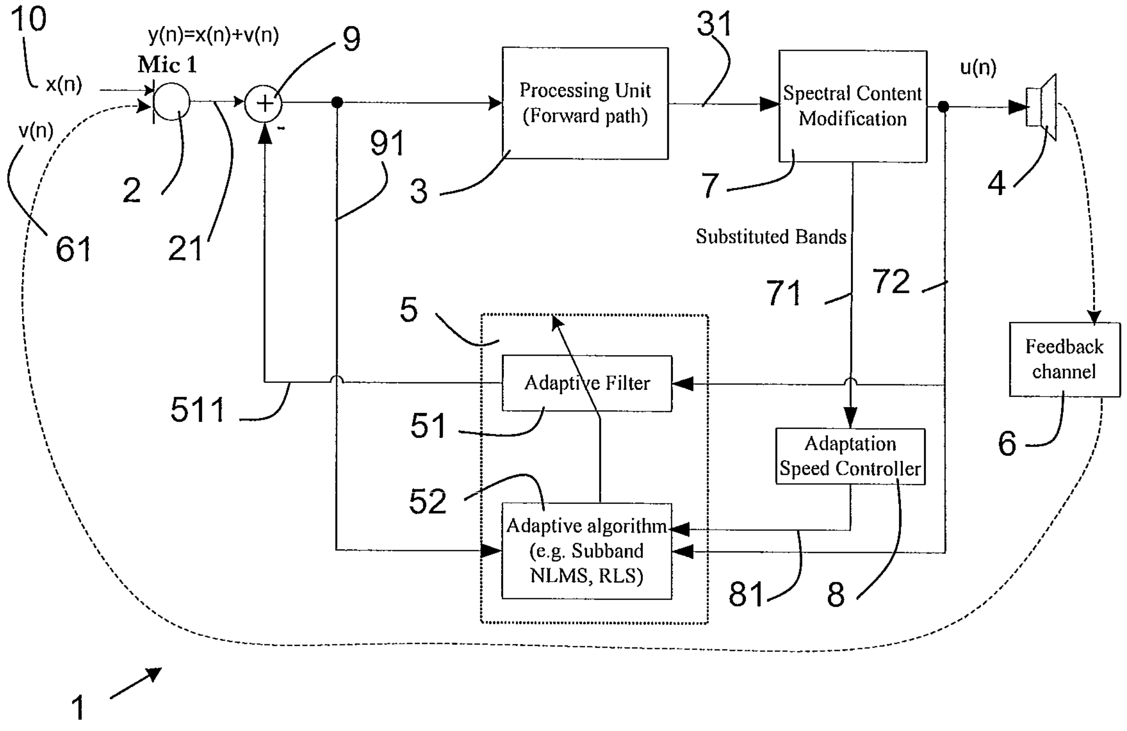
10
x(n)
v(n)
61
y(n)=x(n)+v(n)
Mic 1
2
21
9
91
Processing Unit
(Forward path)
3
31
Spectral Content
Modification
7
u(n)
4
Substituted Bands
71
72
5
Adaptive Filter
51
511
52
Adaptive algorithm
(e.g. Subband
NLMS, RLS)
Adaptation
Speed Controller
81
8
Feedback
channel
6
1

SPECTRAL CONTENT MODIFICATION FOR ROBUST FEEDBACK CHANNEL ESTIMATION

TECHNICAL FIELD

The invention relates to feedback cancellation in listening devices, e.g. hearing aids (HA). The invention relates specifically to a listening device for processing an input sound to an output sound according to a user's needs.

The invention furthermore relates to a method of cancelling acoustic feedback in a listening device. The invention furthermore relates to the use of a listening device according to the invention.

The invention may e.g. be useful in applications such as listening devices prone to acoustic feedback, e.g. hearing aids, headsets or active earplugs.

BACKGROUND ART

The following account of the prior art relates to one of the areas of application of the present invention, hearing aids.

In feedback cancellation systems in hearing aids, it is desirable that the output signal (i.e. receiver signal) u(n) is uncorrelated with the target input signal x(n). In this case, the algorithm used for updating the parameters of the feedback cancellation filter is typically operating under the theoretical conditions for which it is derived, and the performance of the feedback cancellation system can be good. However, unfortunately in hearing aid applications the output and input signals are typically not uncorrelated, since the output signal is in fact a delayed (and processed) version of the input signal; consequently, autocorrelation in the input signal leads to correlation between the output signal and the input signal. If correlation exists between these two signals, the feedback cancellation filter will not only reduce the effect of feedback, but also remove components of the input signal, leading to signal distortions and a potential loss in intelligibility (in the case that the input signal is speech) and sound quality (in the case of audio input signals).

The traditional way of getting an output signal which is uncorrelated with the input signal is by using probe noise, where a signal-dependent noise source, uncorrelated with the input signal, is added to the output signal. Although probe noise techniques in principle can reduce the autocorrelation problem, there are a number of disadvantages that make these techniques less than ideal. First, the probe noise must be inserted such that, ideally, it is completely masked by the original output signal, and thus inaudible for the listener. This, in turn, means that the probe noise level is very low compared to the input signal, leading to a low "probe noise-to-interference ratio", where "interference" in this context is the target signal impinging on the microphone, e.g. speech/audio, etc. The consequence of this is a larger variance on the feedback path estimate or/and a long adaptation time. Furthermore, with probe noise techniques the adaptive feedback cancellation filter coefficients are typically estimated based on the probe noise alone, but ignores the potentially useful signal components of the original output signal leading to unnecessary poor working conditions for the adaptive system.

WO 2007/006658 A1 describes a system and method for synthesizing an audio input signal of a hearing device. The system comprises a filter unit for removing a selected frequency band, a synthesizer unit for synthesizing the selected frequency band based on the filtered signal thereby generating a synthesized signal, a combiner unit for combining the filtered signal and the synthesized signal to generate a combined signal.

DISCLOSURE OF INVENTION

Similar to the probe noise techniques, the goal of the proposed scheme is to process the output signal in order to get a signal component which is substantially uncorrelated with the input signal (or at least less correlated than with the unmodified output signal), and which then can be used by the adaptive system to better estimate the feedback channel. As an alternative (or in addition) to probe noise, we propose to use the following scheme based on spectral content modification (e.g. spectral band substitution).

The term 'substantially uncorrelated or at least less correlated than with the unmodified output signal' is in the present context taken to mean that the processed output signal according to the present invention is less correlated with the input signal than an unmodified output signal would have been (i.e. an output signal that had NOT been subject to the processing proposed by the present invention).

While probe noise techniques may exploit simultaneous masking effects of the human auditory system and only allow insertion of a relatively low level of noise (typically 15-25 dB lower than the masker signal) in each spectral band, we propose here for example to completely substitute entire time-frequency tiles of the original signal by a synthetic replica, substantially uncorrelated with the same time-frequency region in the input signal. Similar techniques have been employed in audio coding, where high frequency signal regions are synthesized by replicating low-frequency bands (spectral band replication). In this way, the proposed spectral content modification scheme exploits the fact that for some signal regions the auditory system is relatively insensitive to the specific energy distribution within each critical band. In principle, the more time-frequency tiles that are substituted, the less correlation remains between output and input signal, and the better working conditions for the adaptive feedback cancellation system. However, not all spectral bands of the output signal can be substituted at all times; ideally, only the time-frequency regions for which the substitution is perceptually indistinguishable from the original should be substituted. This can be achieved by using a distortion measure based on a model of the human auditory system. With such a measure it is in principle possible to decide to which extent a human listener is able to distinguish between the original and replica.

An object of the present invention is to provide an alternative scheme for feedback estimation in a listening device.

Objects of the invention are achieved by the invention described in the accompanying claims and as described in the following.

An object of the invention is achieved by a listening device for processing an input sound to an output sound according to a user's needs. The listening device comprises

- an input transducer for converting an input sound to an electric input signal, and
- an output transducer for converting a processed electric output signal to an output sound,
- a forward path being defined between the input transducer and the output transducer and comprising a signal processing unit adapted for processing an SPU-input signal originating from the electric input signal in a time-frequency representation comprising successive time frames each comprising a frequency spectrum of the signal in the time frame in question, the signal processing unit defining an input side and an output side of the forward path and comprising a spectral content modification unit adapted for modifying values of the signal of one or more regions of the frequency spectrum of a given time frame to provide that the modified values are less correlated to the corresponding time-frequency regions of the input signal than the unmodified output signal thereby providing an improved processed output signal, and a feedback loop from the output side to the input side comprising a feedback path estimation unit for estimating the effect of acoustic feedback from the output transducer to the input transducer, wherein the feedback path estimation unit is adapted to use the improved processed output signal in the estimation.

This has the advantage of providing a better accuracy vs. tracking speed trade-off of the feedback path estimate.

In a particular embodiment, the system is adapted to provide that the modifications introduced in the improved processed output signal are not perceptible by the user.

In a particular embodiment, the feedback path estimation unit comprises an adaptive feedback cancellation (FBC) filter comprising a variable filter part for providing a specific transfer function and an update algorithm part for updating the transfer function of the variable filter part, the update algorithm part receiving first and second update algorithm input signals from the input and output side of the forward path, respectively, wherein the second update algorithm input signal is the improved processed output signal.

In a particular embodiment, the forward path comprises an AD and TF conversion unit for converting the electrical input signal to a digital time-frequency input signal comprising $TF_n$-frames representing the spectrum of the input signal in a predefined time step $t_n$, each $TF_n$-frame comprising $TF_{n,m}$-tiles of digitized values of the input signal, magnitude and phase, each $TF_{n,m}$-tile corresponding to a specific time step related to the AD-conversion (a time frame, e.g. corresponding to a predetermined number of consecutive samples of the digitized input signal, e.g. 20 samples or 100 or more) and a specific frequency step of the time to frequency conversion, thereby creating a time frequency map of the input signal to the unit. Typically, the time-to-frequency mapping that generates the TF-tiles from the time domain signal is implemented by Fourier transforming successive (and generally overlapping) time frames of the input signal, e.g. using Fast Fourier Transform (FFT) techniques, or by filtering the input signal in a bank of filters. The advantages of operating in the time-frequency domain are twofold. First, characteristics of auditory perception, in particular simultaneous masking effects are easiest exploited in this domain. Secondly, characteristics of typical input signals are such that the proposed noise substitution is generally (but not always) less perceptible at higher frequencies.

In a particular embodiment, the spectral content modification unit is adapted to base the modification of spectral content of the signal on a model of the human auditory system. More specifically, the model of the human auditory system is capable of comparing to signal segments, a reference signal and a modified signal, and to determine whether the changes introduced in the modified signal are detectable compared to the reference signal. In the proposed context, the reference signal is the original, non-modified signal, while the modified signal is the original signal with noise substituted in one or more sub bands. Given these two signals, the perceptual model is consulted and determines whether it is perceptually acceptable to insert the noise.

In a particular embodiment, the model of the human auditory system is customized to the specific intended user of the listening device. The ‘personalization’ of the model can e.g. take place during the fitting session, e.g. by an audiologist.

In a particular embodiment, the spectral content modification unit is adapted to base the modification of spectral content of a ‘target’ frequency region of the signal on a combination of its original—possibly scaled-content with—possibly scaled-source spectral content of a ‘source’ frequency region. In an embodiment the modified spectral content $T_{i,mod}(f)$ of the target frequency region i is a linear combination of the content $T_i(f)$ of the original target frequency region i and that $S_j(f)$ of the source frequency region j, i.e. $T_{i,mod}(f)=w_t*T_i(f)+w_s*S_j(f)$, where $w_t$ and $w_s$ are scaling (weighting) factors.

In a particular embodiment, the spectral content modification unit is adapted to base the modification of spectral content of a ‘target’ frequency region of the signal on a substitution of its original content with—possibly scaled-source spectral content from a ‘source’ frequency region.

In a particular embodiment, the spectral content modification unit is adapted to base the modification of spectral content of a target frequency region of a time frame on spectral band replication where relatively high frequency regions are synthesized by replicating relatively low-frequency regions. The criterion used for this could e.g. be as described above: The perceptual model is consulted to determine whether the perceptual distortion introduced by the substitution would be acceptable. A potential advantage of copying content from other spectral regions of the signal in question (rather than inserting noise from a synthetic source, see below) is that it might be possible to substitute more regions (e.g. TF-tiles) without introducing perceptual distortions In a particular embodiment, the spectral content modification unit is adapted to base the substitution of spectral content of a frequency region (e.g. a TF-tile) on appropriately band-pass filtered and scaled white noise. The advantage of doing this is that the introduced noise is completely uncorrelated with the corresponding frequency region (e.g. TF-tile) of the input signal, with guarantee (in other embodiments operates with spectral copying it would in principle be possible that the regions (TF-tiles) in question are not completely uncorrelated).

In a particular embodiment, the spectral content modification unit is adapted to base the modification of spectral content of a target frequency region of a time frame on randomization of the phase spectrum of the region, while maintaining the magnitude spectrum of the region. This would be an advantage in the case that the forward path of the HA applies the gain to compensate for the hearing loss in sub bands. With the phase randomization approach the sub band filtering of the forward path is simply re-used, leading to an implementational advantage/computational complexity reduction.

In a particular embodiment, the spectral content modification unit is adapted to base the modification of spectral content of a target frequency region of a time frame on source spectral content from a spectrally neighbouring region.

In a particular embodiment, the spectral content modification unit is adapted to base the modification of spectral content of a frequency region of a time frame on source spectral content from the same region but selected from another input transducer, the other input transducer being either located in the same listening device or in another spatially separated device, e.g. a corresponding listening device (e.g. in case of a hearing aid, either in the same hearing aid or in a hearing aid of the opposite ear). This approach may have the desirable effect that more frequency regions (e.g. TF-tiles) can be substituted without introducing perceptual artifacts, as compared to the case where appropriately filtered noise is inserted.

In a particular embodiment, a target frequency region and/or a source frequency region correspond to a target tile and a source tile, respectively, of the time frequency map of the signal. In a particular embodiment, the spectral content modification unit is adapted to base the modification or substitution of spectral content of a target TF-tile on (e.g. linear) combinations between the original content of the target TF-tile and a synthetic spectral content of a source TF-tile. In this way it is possible to achieve an appropriate trade-off between perceptual quality and uncorrelatedness. Specifically, an original TF-tile could be substituted by a linear combination of itself and an appropriately filtered noise sequence. When the noise part of the linear combination is high, a high degree of uncorrelatedness is achieved with the corresponding TF-tile of the input signal, but the inserted noise may be perceptually detectable, leading to a reduction of signal quality.

In a particular embodiment, the listening device comprises an Adaptation Speed Controller unit for controlling the speed at which the adaptive FBC filter adapts to changes in its input signal in dependence of a control signal from the spectral modification unit. If noise has been substituted in a particular frequency region, it is known that the receiver (output) signal and input signal will be uncorrelated in this frequency region. This, in turn, means that it is possible to let the adaptive algorithms converge much faster, typically by increasing the step length parameter often denoted by $\mu$ in NLMS type of algorithms in the frequency range in question (this requires e.g. a sub-band version of the NLMS setup or a shaping filter). The positive consequence of this is that changes in the actual feedback path can be tracked faster than what would otherwise be possible.

In a particular embodiment, the listening device is a hearing instrument for adapting an acoustic input signal to a users needs, a headset, a headphone or an active earplug.

A method of reducing acoustic feedback in a listening device is furthermore provided by the present invention, the method comprising

- converting an input sound to an electric input signal,
- providing a forward path for processing an input signal in a number of frequency bands, and providing a time frequency map of a processed output signal, an input and an output side of the forward path being defined as before and after processing, respectively, and
- providing a forward path for processing an input signal originating from the electric input signal in a time-frequency representation comprising
- providing successive time frames each comprising a frequency spectrum of the input signal in the time frame in question,
- modifying values of the signal of one or more regions of the frequency spectrum of a given time frame to provide that the modified values are less correlated to the corresponding time-frequency regions of the input signal than the unmodified output signal thereby providing an improved processed output signal
- converting the processed electric output signal to an output sound, and
- providing a feedback loop comprising a feedback path estimation unit for estimating the effect of acoustic feedback from the output transducer to the input transducer,
- providing that the improved processed output signal is used in the feedback estimation.

The method has the same advantages as the listening device outlined above. It is intended that the method can be combined with the same features as described for the device (appropriately converted to corresponding actions).

At least some of the features of the system and method described above may be implemented in software and carried out fully or partially on a signal processing unit of a hearing instrument caused by the execution of signal processor-executable instructions. The instructions may be program code means loaded in a memory, such as a RAM, or ROM located in a hearing instrument or another device via a (possibly wireless) network. Alternatively, the described features may be implemented by hardware instead of software or by hardware in combination with software.

Use of listening device as described above, in the section describing 'mode(s) for carrying out the invention' and in the claims is moreover provided by the present invention. Use is provided in a hearing instrument for adapting an acoustic input signal to a users needs, a headset, a headphone or an active earplug.

In a further aspect, a software program for running on a signal processor of a listening device is moreover provided by the present invention. When the software program implementing at least some of the steps of the method described above, in the detailed description of 'mode(s) for carrying out the invention' and in the claims, is executed on the signal processor, a solution specifically suited for a digital hearing aid is provided.

In a further aspect, a medium having instructions stored thereon is moreover provided by the present invention. The instructions, when executed, cause a signal processor of a listening device as described above, in the detailed description of 'mode(s) for carrying out the invention' and in the claims to perform at least some of the steps of the method described above, in the detailed description of 'mode(s) for carrying out the invention' and in the claims.

Further objects of the invention are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements maybe present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The invention will be explained more fully below in connection with a preferred embodiment and with reference to the drawings in which:

FIG. 1 a hearing instrument according to an embodiment of the invention,

The FIGURE is schematic and simplified for clarity, and it just shows details which are essential to the understanding of the invention, while other details are left out.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Mode(S) for Carrying Out the Invention

The proposed scheme is general in the sense that it supports any type of spectral content modification, e.g., appropriately filtering a white noise sequence, or randomization of the phase spectrum in a given band (while maintaining the magnitude spectrum), that is perceptual noise substitution, copying and scaling of spectral content from neighbouring bands, that is spectral band replication, copying and scaling of spectral content from the same band but from another microphone (either in the same hearing aid or the hearing aid from the opposite ear), etc.

FIG. 1 outlines the proposed scheme in the form of a listening device 10 (here a hearing instrument) comprising a microphone 2 (Mic 1 in FIG. 1) for converting an input sound to a an electric (digitized) input signal 21, a receiver 4 for converting an (electric) improved processed output signal 72 to an output sound, a forward path comprising a signal processing unit 3 (Processing Unit (Forward path) block) being defined there between. The digital input signal 21 is denoted y(n)=x(n)+v(n) in FIG. 1, where n is a frame number, each frame comprising a number of sample values representing the time varying input signal in a time frame, the number of values per frame depending on the sampling frequency and the length in time of a frame, x(n) is representative of the desired (target) signal and v(n) is representative of the (unintentional) feedback signal. The improved processed output signal 72 is denoted u(n) in FIG. 1, again indicating a digital frame based representation of the output (and 'reference') signal. The signal processing unit 3 is adapted to provide a frequency dependent gain customized to a user's particular needs, the (feedback corrected) input signal 91 to the signal processing unit being split into a number of frequency bands, and to provide a time-frequency map of the processed output signal. The forward path further comprises an SCM unit 7 (Spectral Content Modification block) for completely substituting entire time-frequency tiles of the original signal by a synthetic replica (based on a model of the human auditory system), less correlated with the same time-frequency region in the input signal x(n) and providing an improved processed output signal 72. The hearing instrument 1 further comprises an internal feedback loop comprising a variable filter 5 for estimating the acoustic feedback (Feedback channel in FIG. 1) from receiver 5 to microphone 2. The variable filter 5 is here shown in the form of an adaptive filter 51 (Adaptive Filter block), whose filter characteristics can be customized by an adaptive filter algorithm 52 (Adaptive algorithm (e.g. Subband, NLMS, RLS) block). The improved processed output signal 72 of the SCM unit 7 is used as input to the receiver 4 and as 'reference signal' to the variable filter (filter part 51 as well as algorithm part 52). The output 511 of the filter part 51 of the variable filter 5 is added to the electric input signal 21 from the microphone 2 in adding unit 9 to provide a feedback corrected input signal 91. This resulting 'error' signal is used as input to the signal processing unit 3 and to the algorithm part 52 of the variable filter 5. The hearing instrument further comprises an adaptation speed controller (ASC) unit 8 (Adaptive Speed Controller block) receiving an input 72 from the SCM unit 7 and providing a (second) input 81 to the algorithm part 52 of the variable filter 5. The adaptation speed controller unit 8 is adapted to control the speed at which the adaptive filter adapts to changes in the inputs, the speed being controlled in dependence of the spectral modification unit.

Time-frequency mapping is e.g. described in e.g. P. P. Vaidyanathan, "Multirate Systems and Filter Banks", Prentice Hall Signal Processing Series.

Adaptive filters and appropriate algorithms are e.g. described in Ali H. Sayed, Fundamentals of Adaptive Filtering, John Wiley & Sons, 2003, ISBN 0-471-5 46126-1, cf. e.g. chapter 5 on Stochastic-Gradient Algorithms, pages 212-280, or Simon Haykin, Adaptive Filter Theory, Prentice Hall, 3rd edition, 1996, ISBN 0-13-322760-X, cf. e.g. Part 3 on Linear Adaptive Filtering, chapters 8-17, pages 338-770.

Psycho-acoustic models of the human auditory system are e.g. discussed in H Hastl, E. Zwicker, Psychoacoustics, Facts and Models, $3^{rd}$ edition, Springer, 2007, ISBN 10 3-540-23159-5, cf. e.g. chapter 4 on 'Masking', pages 61-110, and chapter 7.5 on 'Models for Just-Noticeable Variations', pages 194-202. A specific example of a psycho-acoustic model is: Van de Par et. al., "A new perceptual model for audio coding based on spectro-temporal masking", Proceedings of the Audio Engineering Society $124^{th}$ Convention, Amsterdam, The Netherlands, May 2008.

At the core of the proposed approach lies the perceptual distortion measure, which is based on a model of the auditory system. Given a model of the impaired auditory system, it is possible to take into account the reduced detection capabilities of the impaired auditory system, and thus achieve less correlated output signal than what is possible for non-impaired listeners. Another possibility is to replace the general auditory model with a more person-specific one, and in this way have a solution tailored for the specific hearing aid user.

Several generalizations of the proposed setup are possible. For example, instead of completely replacing the original time-frequency tile with a synthetic one, leading to an either-or decision, it is straightforward to consider e.g. linear combinations between the original and synthetic tile, i.e., a solution where an original time-frequency tile is only partly replaced.

Generally, for a given signal frame to be output from the receiver, we wish to insert as much 'noise' as possible in order to achieve maximum uncorrelatedness with the corresponding frequency region of the input signal, but with the constraint that the inserted noise should be inaudible (the fact that it is possible to insert inaudible noise at all, even for normal-hearing, follows from masking properties of the human auditory system, and is heavily exploited in the field of audio coding, e.g., MPEG3, etc.). In principle, the procedure for inserting noise in a given frame is a 'trial-and-error' procedure where the perceptual model compares several noise-injected candidate frames with the original signal frame, and determines to which extent the noise is detectable. Repeating this in a systematic way for several noise-injected candidate frames allows the finding of the frame with the most noise injected without being audible. This would then be the frame to be output through the D/A converter and receiver. Choosing a particular frequency band as a candidate for noise injection is completely non-critical: if the injected noise turns out to be audible, the perceptual model detects it, and the noise is not injected. From a complexity point of view, however, it may be relevant to choose candidate frequency bands where the noise injection is likely to be successful; this could e.g. be relatively high frequency regions Knowing which frequency regions have been noise substituted allows the "adaptation speech controller" to signal to the "Adaptive algorithm" in which frequency region the convergence speed can be increased.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims. For example, the illustrated embodiments are shown to contain a single microphone. Other embodiments may contain a microphone system comprising two or more microphones, and possibly including means for extracting directional information from the signals picked up by the two or more microphones.

References

WO 2007/006658 A1 (OTICON) Jan. 18, 2007

P. P. Vaidyanathan, Multirate Systems and Filter Banks, Prentice Hall Signal Processing Series, 1993.

Ali H. Sayed, Fundamentals of Adaptive Filtering, John Wiley & Sons, 2003, ISBN 0-471-5 46126-1

Simon Haykin, Adaptive Filter Theory, Prentice Hall, 3rd edition, 1996, ISBN 0-13-322760-X H Hastl, E. Zwicker, Psychoacoustics, Facts and Models, 3rd edition, Springer, 2007, ISBN 10 3-540-23159-5.

Van de Par et. al., A new perceptual model for audio coding based on spectro-temporal masking, Proceedings of the Audio Engineering Society 124th Convention, Amsterdam, The Netherlands, May 2008.

The invention claimed is:

1. A listening device for processing an input sound to an output sound according to a user's needs, the listening device comprising:

an input transducer for converting an input sound to an electric input signal;

an output transducer for converting a processed electric output signal to an output sound;

a forward path being defined between the input transducer and the output transducer and comprising a signal processing unit adapted for processing an SPU-input signal originating from the electric input signal in a time-frequency representation comprising successive time frames each comprising a frequency spectrum of the signal in the time frame in question, the signal processing unit defining an input side and an output side of the forward path and comprising a spectral content modification unit configured to modify values of the signal of one or more regions of the frequency spectrum of a given time frame to provide that the modified values are less correlated to the corresponding time-frequency regions of the input signal than the unmodified output signal thereby providing an improved processed output signal; and a feedback loop from the output side to the input side comprising a feedback path estimation unit for estimating the effect of acoustic feedback from the output transducer to the input transducer, wherein the feedback path estimation unit is adapted to use the improved processed output signal in the estimation, wherein the spectral content modification unit is further configured to base the modification of spectral content of the signal on a model of the human auditory system to provide that the modifications introduced in the improved processed output signal are not perceptible by the user, and the spectral content modification unit is configured to provide that as much noise as possible is inserted in a given signal frame to be output from the output transducer, to achieve maximum uncorrelatedness with a corresponding frequency region of the input signal, under a constraint that the inserted noise be inaudible to the user.

2. A listening device according to claim 1 wherein the feedback path estimation unit comprises an adaptive FBC filter comprising a variable filter part for providing a specific transfer function and an update algorithm part for updating the transfer function of the variable filter part, the update algorithm part receiving first and second update algorithm input signals from the input and output side of the forward path, respectively, wherein the second update algorithm input signal is the improved processed output signal.

3. A listening device according to claim 1 wherein the forward path comprises an AD and TF conversion unit for converting the electrical input signal to a digital time-frequency input signal comprising $TF_n$-frames representing the spectrum of the input signal in a predefined time step $t_n$, each $TF_n$-frame comprising $TF_{n,m}$-tiles of digitized values of the input signal, magnitude and phase, each $TF_{n,m}$-tile corresponding to a specific time step related to the AD-conversion and a specific frequency step related to the TF conversion, thereby creating a time frequency map of the input signal to the unit.

4. A listening device according to claim 1 wherein the model of the human auditory system is customized to the specific intended user of the listening device.

5. A listening device according to claim 1 wherein the spectral content modification unit is adapted to base the modification of spectral content of a 'target' frequency region of the signal on a combination of its original—possibly scaled-content with—possibly scaled-source spectral content of a 'source' frequency region.

6. A listening device according to claim 1 wherein the spectral content modification unit is adapted to base the modification of spectral content of a 'target' frequency region of the signal on a substitution of its original content with—possibly scaled-source spectral content from a 'source' frequency region.

7. A listening device according to claim 1 wherein the spectral content modification unit is adapted to base the modification of spectral content of a target frequency region of a time frame on spectral band replication where relatively high frequency regions are synthesized by replicating relatively low-frequency regions.

8. A listening device according to claim 1 wherein the spectral content modification unit is adapted to base the modification of spectral content of a target frequency region of a time frame on randomization of the phase spectrum of the region, while maintaining the magnitude spectrum of the region.

9. A listening device according to claim 1 wherein the spectral content modification unit is adapted to base the modification of spectral content of a target frequency region of a time frame on source spectral content from a neighbouring region.

10. A listening device according to claim 1, wherein the spectral content modification unit is configured to base the modification of spectral content of a frequency region of a time frame on source spectral content from the same region but selected from another input transducer, the other input transducer being either located in the same listening device or in another spatially separated device.

11. A listening device according to claim 3 wherein a target frequency region and/or a source frequency region correspond to a target tile and a source tile, respectively, of the time frequency map of the signal.

12. A listening device according to claim 1 comprising an Adaptation Speed Controller unit for controlling the speed at which the adaptive FBC filter adapts to changes in its input signal in dependence of a control signal from the spectral modification unit.

13. A method of reducing acoustic feedback in a listening device, the method comprising:

converting an input sound to an electric input signal;

providing a forward path for processing an input signal in a number of frequency bands, and providing a time frequency map of a processed output signal, an input and an output side of the forward path being defined as before and after processing, respectively;

providing a forward path for processing an input signal originating from the electric input signal in a time-frequency representation comprising providing successive time frames each comprising a frequency spectrum of the input signal in the time frame in question;

modifying values of the signal of one or more regions of the frequency spectrum of a given time frame to provide that the modified values are less correlated to the corresponding time-frequency regions of the input signal than the unmodified output signal thereby providing an improved processed output signal, the modifying being based on a model of the human auditory system to provide that modifications introduced in the improved processed output signal are not perceptible by the user;

converting the processed electric output signal to an output sound;

providing a feedback loop comprising a feedback path estimation unit for estimating the effect of acoustic feedback from the output transducer to the input transducer; and providing that the improved processed output signal is used in the feedback estimation.

14. Use of listening device according to claim 1.

15. Use according to claim 14 in a hearing instrument for adapting an acoustic input signal to a users needs, a headset, a headphone or an active earplug.

16. A listening device according to claim 1, wherein the modification depends on a distortion measure based on said model of the human auditory system.

17. A listening device according to claim 1, wherein the model of the human auditory system comprises a model of an impaired auditory system.

18. A listening device according to claim 1, wherein the model of the human auditory system is configured to compare two signal segments, a reference signal and a modified signal, and to determine whether changes introduced in the modified signal are detectable compared to the reference signal, the reference signal being the original, unmodified signal, and the modified signal is the original signal with noise substituted in one or more sub-bands.

19. A listening device according to claim 1, wherein the model of the human auditory system comprises a masking model.

20. A listening device for processing an input sound to an output sound according to a user's needs, the listening device comprising:

an input transducer for converting an input sound to an electric input signal;

an output transducer for converting a processed electric output signal to an output sound;

a forward path being defined between the input transducer and the output transducer and comprising a signal processing unit adapted for processing an SPU-input signal originating from the electric input signal in a time-frequency representation comprising successive time frames each comprising a frequency spectrum of the signal in the time frame in question, the signal processing unit defining an input side and an output side of the forward path and comprising a spectral content modification unit configured to modify values of the signal of one or more regions of the frequency spectrum of a given time frame to provide that the modified values are less correlated to the corresponding time-frequency regions of the input signal than the unmodified output signal thereby providing an improved processed output signal;

a feedback loop from the output side to the input side comprising a feedback path estimation unit for estimating the effect of acoustic feedback from the output transducer to the input transducer, wherein the feedback path estimation unit is adapted to use the improved processed output signal in the estimation; and an Adaptation Speed Controller unit for controlling the speed at which an adaptive FBC filter adapts to changes in its input signal in dependence of a control signal from the spectral modification unit, wherein the spectral content modification unit is further configured to base the modification of spectral content of the signal on a model of the human auditory system to provide that the modifications introduced in the improved processed output signal are not perceptible by the user, and the Adaptation Speed Controller unit is configured to signal to an update algorithm of the adaptive FBC filter to increase the convergence speed in frequency regions where noise has been inserted.

21. A listening device according to claim 12, wherein an update algorithm of the adaptive FBC filter comprises a sub-band NLMS type algorithm, and a step length parameter of the NLMS algorithm is increased in a particular frequency region, if noise has been substituted in said particular frequency region.

* * * * *